(12) United States Patent
Malvoisin

(10) Patent No.: US 11,559,800 B2
(45) Date of Patent: Jan. 24, 2023

(54) DEVICE FOR LOCKING A VOLUME ADJUSTMENT SCREW FOR A PIPETTING SYSTEM

(71) Applicant: GILSON SAS, Villiers-Lebel (FR)

(72) Inventor: Hervé Malvoisin, Paris (FR)

(73) Assignee: GILSON SAS, Villiers-Lebel (FR)

( * ) Notice: Subject to any disclaimer, the term of this patent is extended or adjusted under 35 U.S.C. 154(b) by 253 days.

(21) Appl. No.: 17/047,100

(22) PCT Filed: Apr. 12, 2019

(86) PCT No.: PCT/FR2019/050877
§ 371 (c)(1),
(2) Date: Oct. 13, 2020

(87) PCT Pub. No.: WO2019/202246
PCT Pub. Date: Oct. 24, 2019

(65) Prior Publication Data
US 2021/0162399 A1 Jun. 3, 2021

(30) Foreign Application Priority Data
Apr. 17, 2018 (FR) ...................................... 1853368

(51) Int. Cl.
*B01L 3/02* (2006.01)
(52) U.S. Cl.
CPC ....... *B01L 3/0224* (2013.01); *B01L 2200/021* (2013.01); *B01L 2200/025* (2013.01); *B01L 2200/087* (2013.01); *B01L 2200/14* (2013.01)
(58) Field of Classification Search
None
See application file for complete search history.

(56) References Cited

U.S. PATENT DOCUMENTS

| 5,892,161 A | 4/1999 | Conley et al. |
| 2007/0095159 A1 | 5/2007 | Champseix et al. |

(Continued)

FOREIGN PATENT DOCUMENTS

| CN | 1826515 A | 8/2006 |
| CN | 202113872 U | 1/2012 |

(Continued)

OTHER PUBLICATIONS

Search Report for CN2019800262749 dated Oct. 26, 2021 and translation thereof.

(Continued)

*Primary Examiner* — P. Kathryn Wright
(74) *Attorney, Agent, or Firm* — Pearne & Gordon LLP

(57) ABSTRACT

A device for locking a volume adjustment screw for a pipetting system, comprising a control member which rotates as one with a position selector, the member cooperating with a locking wheel such that: when the selector is in the free adjustment position, the member ensures that the wheel is axially spaced from another wheel, such that the teeth of the wheels do not cooperate with each other; when the selector is in the fine adjustment position, the member allows the wheel to move away from and then to move axially towards the other wheel while transitioning from one tooth to another; when the selector is in the locking position, the member axially locks the wheel to prevent the teeth from being disengaged.

14 Claims, 9 Drawing Sheets

(56) References Cited

U.S. PATENT DOCUMENTS

| | | | |
|---|---|---|---|
| 2013/0233095 A1* | 9/2013 | Wilmer | B01L 3/021 |
| | | | 73/864.01 |
| 2016/0303557 A1* | 10/2016 | LaCroix | B01L 3/0224 |
| 2018/0250667 A1 | 9/2018 | Dudek et al. | |
| 2019/0083970 A1* | 3/2019 | Schiraga | B01L 3/0227 |

FOREIGN PATENT DOCUMENTS

| | | | |
|---|---|---|---|
| CN | 103506173 A | 1/2014 |
| CN | 103920548 A | 7/2014 |
| CN | 105531030 A | 4/2016 |
| CN | 106999937 A | 8/2017 |
| EP | 1514600 A1 | 3/2005 |
| EP | 2803411 A1 | 11/2014 |
| FR | 3040896 A1 | 3/2017 |

OTHER PUBLICATIONS

First Office action for CN2019800262749 dated Nov. 1, 2021 and translation thereof.
International Search Report and translation for PCT/FR2019/050877 dated Aug. 19, 2019.
Written Opinion for PCT/FR2019/050877 dated Aug. 19, 2019.
Search Report for French application No. FR 1853368 dated Dec. 20, 2018.
Specification and drawings for U.S. Appl. No. 17/046,944 entitled "Dog Clutch System for Holding the Position of a Volume Adjustment Screw for a Sampling Pipette", filed Oct. 12, 2020.
Specification and drawings for U.S. Appl. No. 17/052,324 entitled "System for Ejecting Tips of Sampling Pipettes With Improved Ergonomics", filed Nov. 2, 2020.

* cited by examiner

DEVICE FOR LOCKING A VOLUME ADJUSTMENT SCREW FOR A PIPETTING SYSTEM

CROSS-REFERENCE TO RELATED APPLICATIONS

This is a National Stage application of PCT international application PCT/FR2019/050877, filed on Apr. 12, 2019, which claims the priority of French Patent Application No. 1853368, filed Apr. 17, 2018, both of which are incorporated herein by reference in their entirety.

TECHNICAL FIELD

The present invention relates to the field of pipetting systems such as automated pipetting systems called robots, or even more preferentially monochannel or multichannel collection pipettes, also called laboratory pipettes, or even air displacement liquid transfer pipettes, for the calibrated liquid collection and introduction into containers. Such pipettes, whether manual, motorised or hybrid, are to be held in hand by an operator during liquid collection and dispense operations.

The invention more particularly relates to means implemented to adjust the liquid volume to be collected.

STATE OF PRIOR ART

On conventional pipettes, a screw for adjusting the volume to be collected is provided, which screw is rotatably controlled by a control knob of the pipette, via a control rod connecting this knob to the volume adjustment screw.

When the pipette includes a counter designed to display very accurate volume values, for example a four-digit counter, adjusting the pipette to a given value can sometimes turn out to be delicate. Indeed, the last digit of the counter is generally associated with a drum the rotation of which can be quicker than that of the pipette control knob actuated by the operator, resulting in a difficulty to reach the desired accurate value.

To address this issue, it can be contemplated to adjoin a system for holding the volume adjustment screw, in different positions of this screw.

If this holding system enables the accurate desired volume value to be more readily reached, it however opposes a significant mechanical strength when rotating the screw. This strength, which is therefore beneficial to perform accurate volume adjustments, can however turn out to be restrictive when the adjustment involves scanning a large volume range.

DISCLOSURE OF THE INVENTION

To address at least partially these drawbacks, one object of the invention is first a locking device for locking a volume adjustment screw for a pipetting system, the locking device comprising:

on the one hand a ring dogging system for holding the position of the adjustment screw, the system including:
  a first toothed wheel comprising first teeth;
  a second toothed wheel comprising second teeth, said first toothed wheel being a lock wheel for being rotatably fixed with respect to a fixed piece of the pipetting system, and the second wheel for being rotatably integral with the adjustment screw, or vice versa;
  elastic return means capable of returning the first and second wheels against each other in order to make the first teeth cooperate with the second teeth,
and on the other hand a control system for controlling the holding ring dogging system, the control system including:
  a position selector designed to be rotatably moved along a longitudinal central axis of the pipetting system, between three positions including a free adjustment position, a fine adjustment position, and a locking position;
  a control member rotatably integral with the position selector, the control member cooperating with said lock wheel of the ring dogging system such that:
  a) when the selector is in the free adjustment position, the control member holds the lock wheel axially away from the other wheel of the ring dogging system, opposing the force developed by the elastic return means, such that the first and second teeth do not cooperate with each other;
  b) when the selector is in the fine adjustment position, the control member allows the lock wheel to axially move away from and then closer to the other wheel when shifting from a tooth to another caused by the rotation of this other wheel; and
  c) when the selector is in the locking position, the control member axially locks said lock wheel so as to prohibit disengagement of the first and second teeth.

By means of the control system which controls the ring dogging system for holding the adjustment screw, this ring dogging system can alternately be made inactive, active, and locked. In the first case, obtained with the selector in the free adjustment position, the teeth of the toothed wheels do not cooperate and thus exert no resistance to the rotation of the adjustment screw. In this position, a large volume range can be scanned, without any particular effort. In the second case, obtained with the selector in the fine adjustment position, the teeth of the toothed wheels cooperate with each other, but they are capable of disengaging and then re-engaging in a different relative position of both wheels. This position enables an accurate desired volume value to be readily reached, in particular at the end of adjustment. Finally, in the third case obtained with the selector in the locking position, the teeth of the toothed wheels cooperate with each other, and they cannot disengage. Consequently, the adjusted volume cannot be modified, such that this position turns out to be particularly interesting to assume during pipetting operations, to avoid an undesired target volume change.

The invention has preferably at least one of the following optional characteristics, taken alone or in combination.

The lock wheel includes at least one radial lug projecting outwardly, and the control member includes at least one track associated with each radial lug, the elastic return means forcing the radial lug to bear against its associated track, the latter comprising:
  a first track portion cooperating with the radial lug when the selector is in the free adjustment position;
  a second track portion cooperating with the radial lug when the selector is in the fine adjustment position, the second track portion being axially offset from the first track portion within the control member; and
  a third track portion cooperating with the radial lug when the selector is in the locking position, a stop element provided on the control member being arranged axially facing the third track portion, such that the radial lug is axially located between this stop element, and the third track portion.

The first, second and third track portions are arranged in this order along a circumferential direction. However, a different circumferential order could be adopted, without departing from the scope of the invention.

The track includes a slope-shaped transition zone between the first and second track portions, and the second track portion is axially located at the same level as the third track portion.

The stop element forms, with the third track portion, a slot circumferentially open on the side of the second track portion, and closed on the opposite side by a slot bottom.

The control member includes several tracks circumferentially spaced from each other, each cooperating with a radial lug of the lock wheel.

The control member is preferentially annular.

The control member and the selector are made as a single piece, or by two distinct rotatably coupled pieces. The latter configuration facilitates the assembly of the pipetting system.

Preferably, said second teeth of the second wheel form a number N of concentric annular rows, the number N being an integer higher than or equal to 2 and each row being possibly discontinuous, said second wheel has at least one tooth covering zone in which the N annular rows of second teeth have respectively N covering sectors which cover each other along a radial direction of the second wheel, and the second teeth of the N covering sectors are angularly offset from each other such that at least one of the first teeth of the first toothed wheel can be in several relative positions with respect to the second wheel, in each of which this first tooth is in contact with one of the second teeth of one of the N sectors and in contact with one of the second teeth of another of these N sectors.

This preferred configuration thus has the feature of during a ring dogging system for holding the volume adjustment screw in different positions. The number of these distinct positions can be extremely high, without however facing manufacturing problems. Indeed, by providing a second toothed wheel with several concentric annular rows of second teeth, and by conducting an angular offset of these teeth within each covering zone, it is possible to hold the adjustment screw in many positions without facing any problem with the feasibility of these teeth. In other words, the invention turns out to be particularly ingenious in comparison with a solution only providing a single annular row of teeth on the second wheel, even if this solution is also within the scope of the invention. Actually, to reach the same number of holding positions than with the invention, this second wheel should thereby have teeth with very small dimensions within the single row, which can turn out to be difficult to manufacture.

Preferably, each of the N covering sectors of the second toothed wheel has a same pitch P between its second teeth, and the angular offset between any two directly consecutive covering sectors, among said N sectors, has a value P/N.

The first toothed wheel has a single annular row of first teeth, having the same pitch P between the first teeth.

The integer N is preferentially equal to two, but it could be higher, without departing from the scope of the invention.

Said second wheel has several teeth covering zones, circumferentially spaced from each other, the number of these covering zones being preferentially higher than three.

Each annular row of second teeth has toothed portions circumferentially spaced apart by non-toothed portions, and the covering sectors are formed at the ends of the toothed portions.

Another object of the invention is a pipetting system comprising a volume adjustment screw, as well as a device for locking this screw. The system is preferentially a preferably manual, collection pipette, but the invention is applicable to any other pipetting system listed above.

Preferably, the system includes a four-digit counter.

Preferably, the position selector has an external gripping portion arranged about a control rod for controlling the pipetting system.

The system is preferentially designed to warn of the selector shifting to each of its three positions, preferably by clicks.

Each radial lug of the lock wheel radially passes through the control member of the control system, to be slidably housed in a corresponding longitudinal groove of the fixed piece of the pipetting system.

Finally, the free adjustment position of the selector is offset, in a circumferential direction, by an angular value between 15 and 30° with respect to the fine adjustment position, and the locking position is offset, in an opposite circumferential direction, by an angular value between 15 and 30° with respect to the fine adjustment position.

Further advantages and characteristics of the invention will appear in the non-limiting detailed description below.

BRIEF DESCRIPTION OF THE DRAWINGS

This description will be made with regard to the appended drawings in which.

DETAILED DESCRIPTION OF PREFERRED EMBODIMENTS

Figure 1:
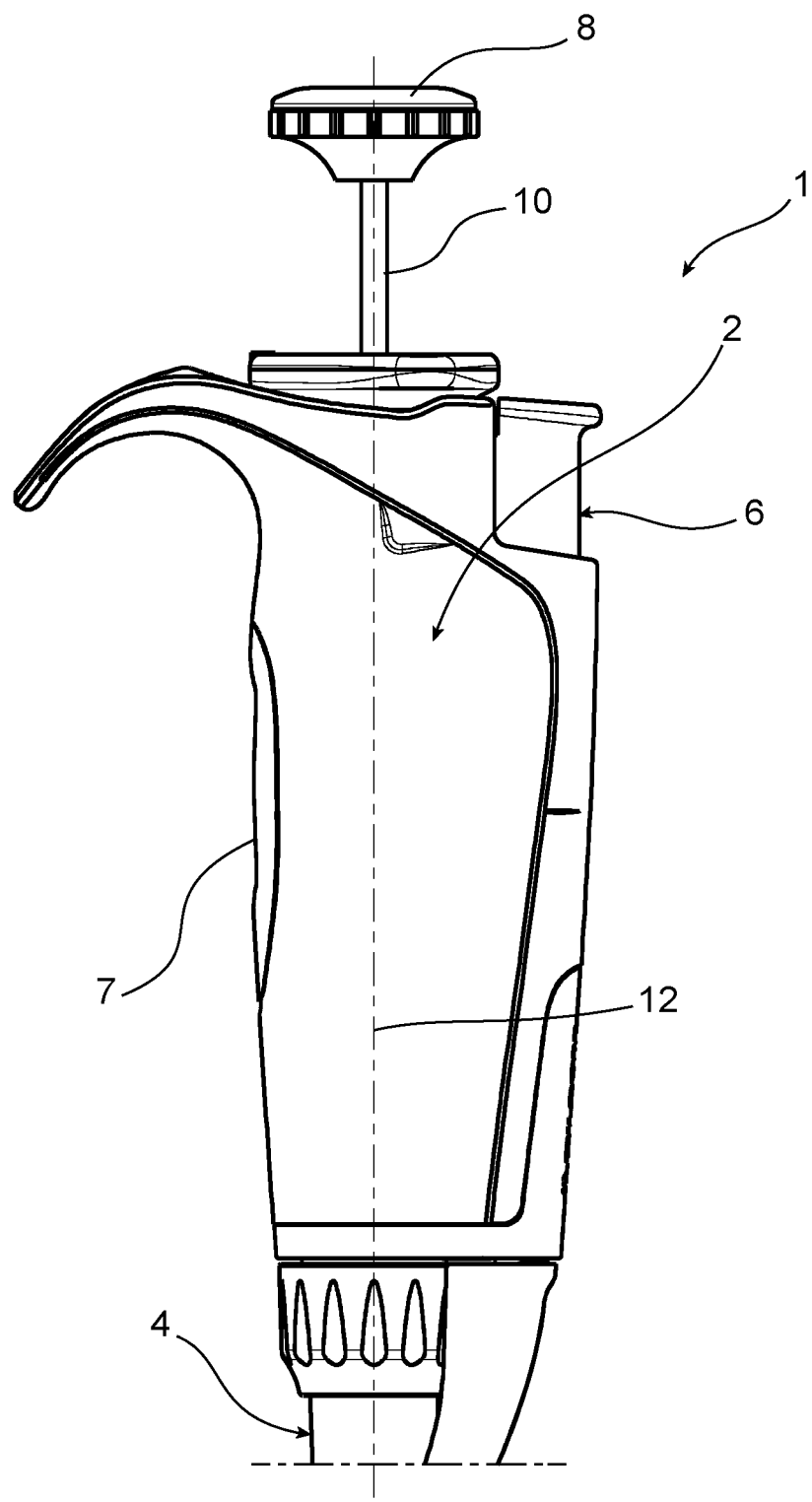
FIG. 1 represents a front view of an air displacement collection pipette, according to the invention.

With reference first to FIG. 1, a manual monochannel collection pipette 1, according to the invention is represented. However, the invention is not limited to such a pipette, but is applicable similarly to multichannel pipettes or to any other manual, motorised or hybrid pipetting system.

The herein manual, air displacement pipette 1, comprises in an upper part, a handle forming body 2, as well as a bottom part 4 for integrating at its lower end, a collection cone holder tip (not represented). This tip is provided to hold a cone, also called a consumable and for being ejected from the tip by an ejector system 6, once the pipetting operations are completed.

Figure 2:
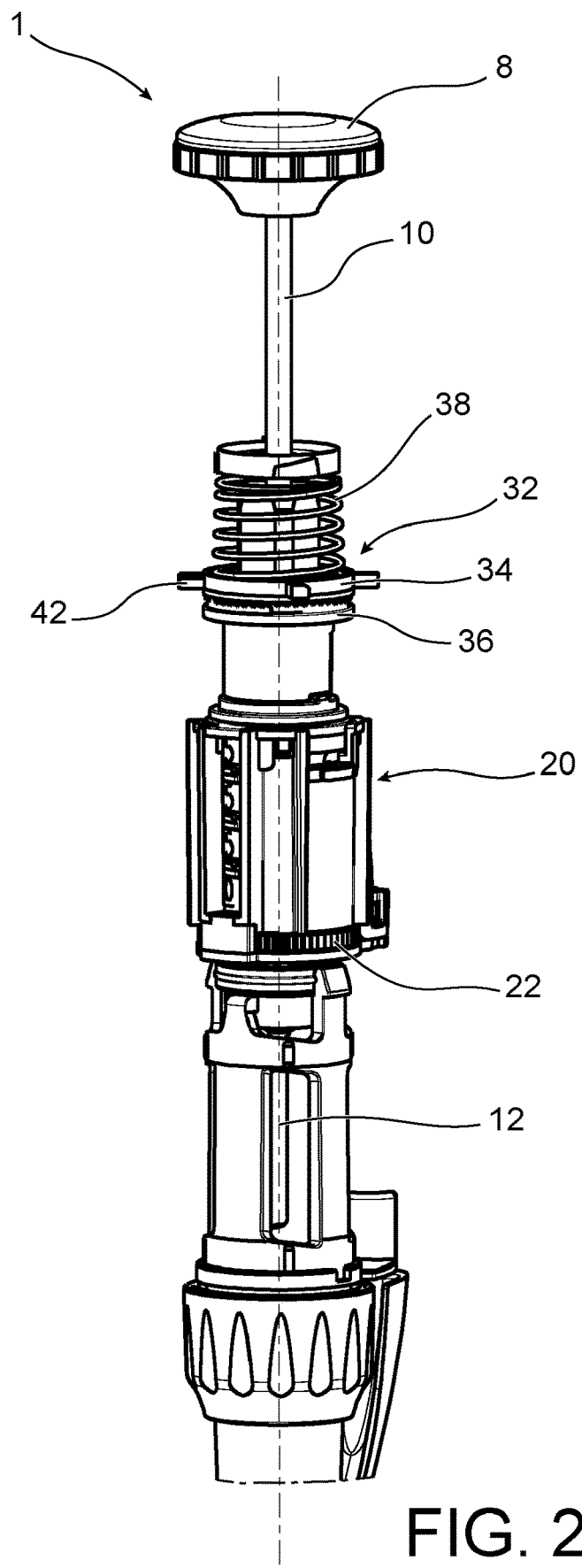
FIG. 2 represents a perspective view of part of the pipette shown in the previous figure, comprising a device for locking the volume adjustment screw, according to a preferred embodiment of the invention.
Figure 3:
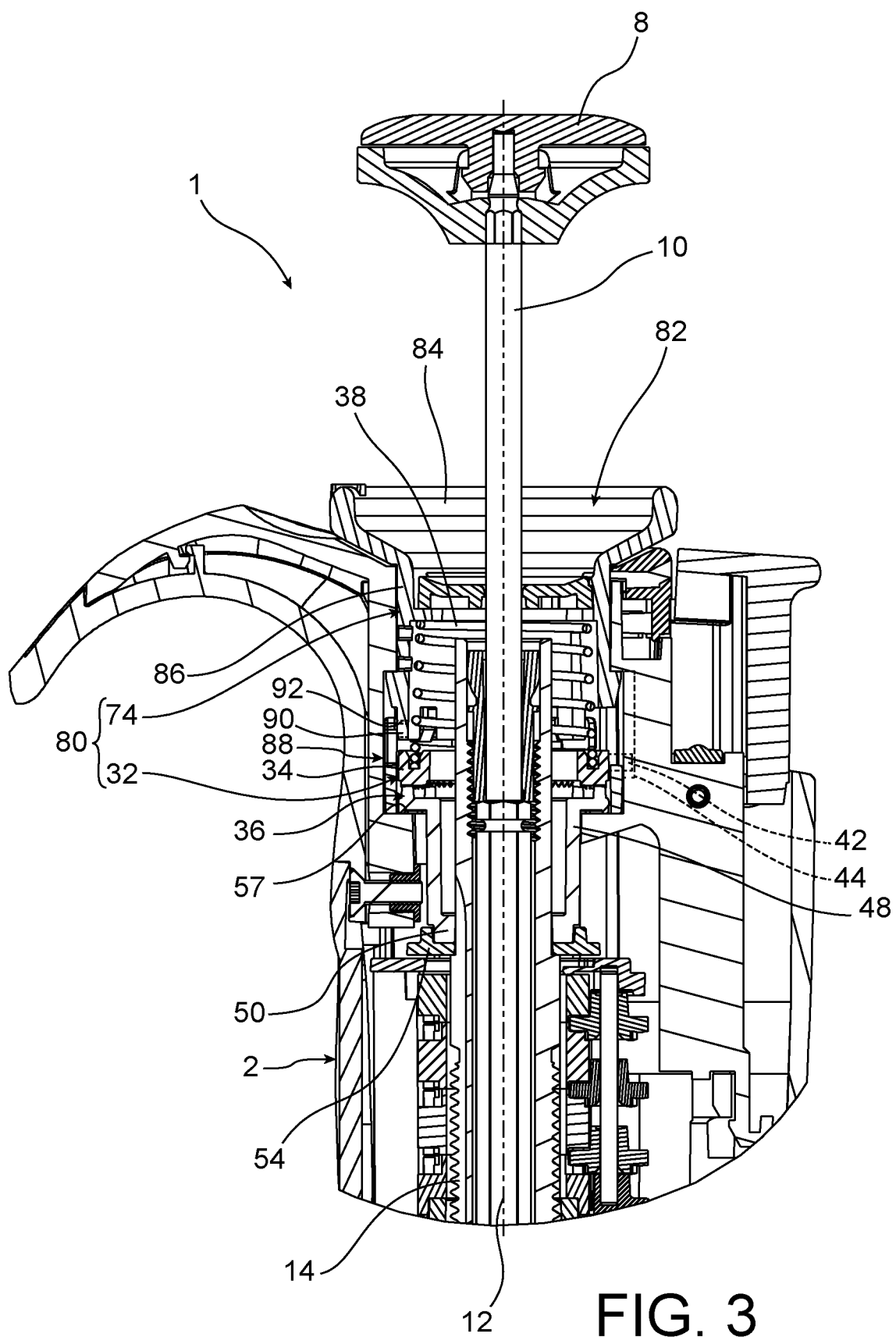
FIG. 3 represents a cross-section view of an upper part of the pipette shown in the previous figure.

As is visible in FIGS. 1 to 3, the pipette 1 includes a control knob 8 for being actuated by an operator's thumb, in order to perform different pipetting operations such as collecting the liquid, and dispensing the same. The knob 8 is mounted to the top end of a control rod 10 for being translationally displaced during the abovementioned pipetting steps, along a longitudinal central axis 12 of the pipette. The knob 8 is rotatably coupled to the rod 10, and the latter has a lower end cooperating with a volume adjustment screw 14. This cooperation is made such that a rotation of the control rod 10 causes a rotation of the screw 14 about its own axis, being preferably the same as the longitudinal central axis 12 of the pipette.

In a known manner, the rotation of the adjustment screw 14 causes its translation along the axis 12, or the translation of another piece, in order to axially displace a piston housed in a suction chamber of the lower part 4 of the pipette. It is the adjustment of the top position of this piston which makes it possible to influence the volume subsequently collected upon pipetting.

Figure 4:
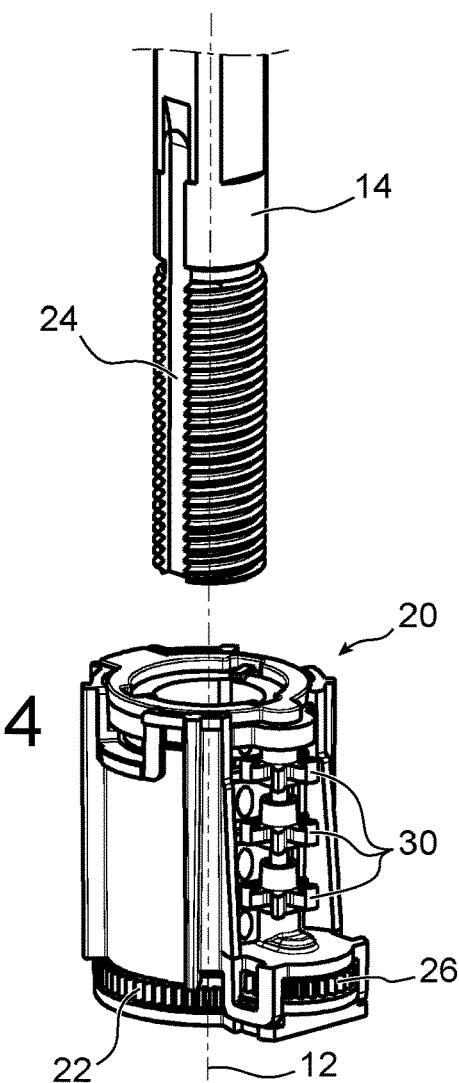
FIG. 4 represents a perspective view of a counter equipping the pipette shown in the previous figures.

FIGS. 2 and 4 show that the volume adjustment screw 14 rotatably drives a counter 20, which is to display the value of the volume adjusted through a window 7 (referenced in FIG. 1) of the handle 2. This counter 20 is here a four-digit counter. This counter type provides a very high accuracy in comparison with counters comprising fewer digits, for example with respect to a counter having only three digits.

Figure 5:
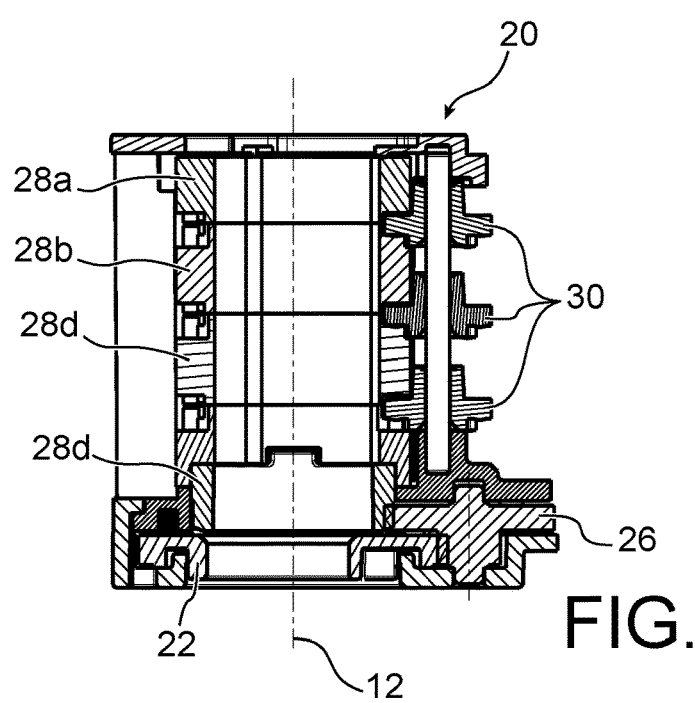
FIG. 5 represents a longitudinal cross-section view of the counter shown in the previous figure.

The counter 20 first comprises a gear system equipped with an externally-toothed wheel 22 centred on the axis 12, directly rotatably driven by the adjustment screw 14. This driving is made for example via a lug inwardly projecting from the wheel 22, and housed in a longitudinal groove 24 of the screw 14. This wheel 22 meshes with another off-centred, externally-toothed wheel 26, which itself meshes with teeth provided on a fourth drum 28d of the counter, informing about the fourth digit of adjusted volume. The fourth drum 28d, visible in FIG. 5, rotates at a high speed with respect to the control knob, for example at a speed five times higher.

The counter also includes a first drum 28a, a second drum 28b, as well as a third drum 28c respectively informing about the first, second, and third digits of the adjusted volume. These drums 28a-28d are superimposed with each other along axis 12, and drive each other in a known manner, via movement transmission members 30.

The accuracy of such a counter 20 is associated with the implementation of a system specific to the invention, enabling the adjustment screw 14 to be held/locked, once the same has been brought to the accurate position leading to the desired volume value. This system 32, of the ring dogging nature, also enables the screw 14 to be readily displaced between different positions, during its rotation performed to change the set point of volume to collect. The system 32 turns out to be particularly advantageous in that it helps the operator to accurately adjust the last digit of the volume to the desired value, in spite of the high rotation speed of the fourth drum observed during the rotation of the control knob of the pipette. Hence, the volume adjustment ergonomy is largely improved.

Figure 6:
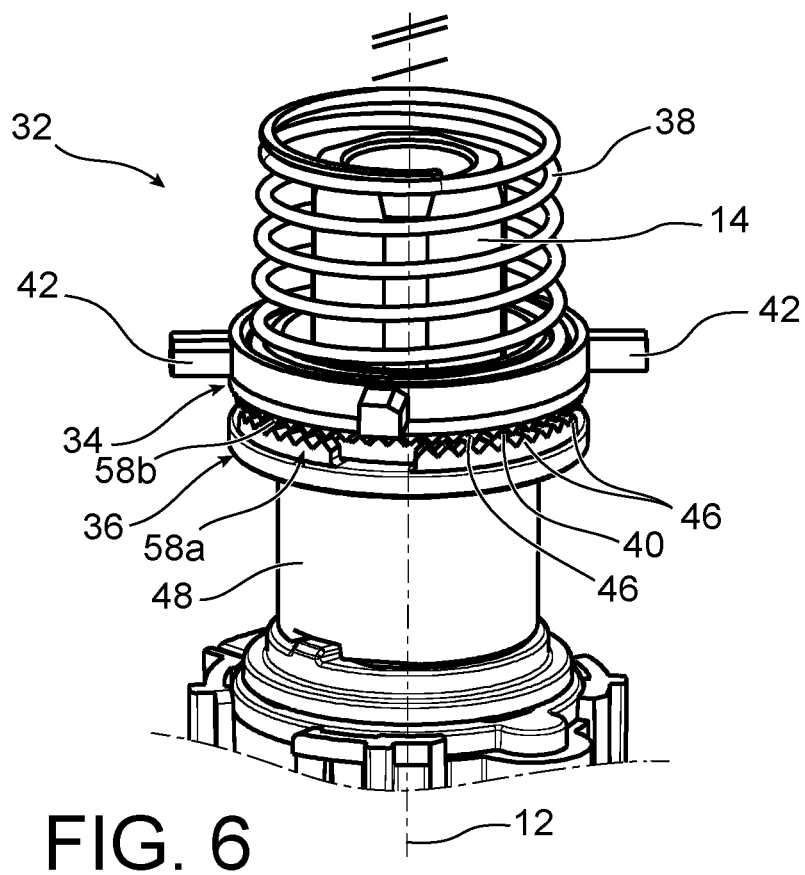
FIG. 6 represents a detailed perspective view of the holding ring dogging system equipping the locking device shown in FIG. 2.

The position holding system 32, visible in FIGS. 2, 3 and 6, generally comprises a first toothed wheel 34 cooperating with a second toothed wheel 36, and a compression spring 38 returning against each other both coaxial wheels 34, 36 centred on the axis 12.

The first wheel 34, the one located higher on the pipette, includes first teeth 40 which extend axially downwardly. This wheel 34 is rotatably fixed with respect to the handle 2, via radial lugs 42 circumferentially spaced and projecting outwardly from the wheel. Each lug 42 is slidably housed in a longitudinal groove 44 of the internal surface of the handle 2, as is depicted for one of them in FIG. 3. The first wheel 34 thus remains rotatably fixed in the handle 2, but translationally movable inside the same, along the axis 12.

Under the first wheel 34, also called a lock wheel, the second wheel 36 includes second teeth 46 which extend axially upwardly. This second wheel 36 is carried by a ring 48, or a shank, the bottom end of which comprises a rotatable coupling means 50 through which the adjustment screw 14 passes. The means 50 ensures rotatable coupling with the screw 14 by form fitting, for example by the presence of a flat or a similar element. The wheel 36 thus remains rotatably driven by the adjustment screw 14, and remains translationally fixed. The latter feature is achieved by abutting the ring 48 on a bottom stop 54 secured inside the handle 2, and/or by abutting the wheel 36 on an internal shoulder 57 of this handle.

The spring 38 applies in turn a pressure onto the upper part of the first wheel 34, via a spring bottom end housed in an upper throat of this wheel. The axial force developed by the spring 38 thus causes the first wheel 34 to be displaced downwardly and to be pressed against the second wheel 36 which remains translationally fixed, resulting in a cooperation between the first and second teeth 40, 46.

Figure 7:
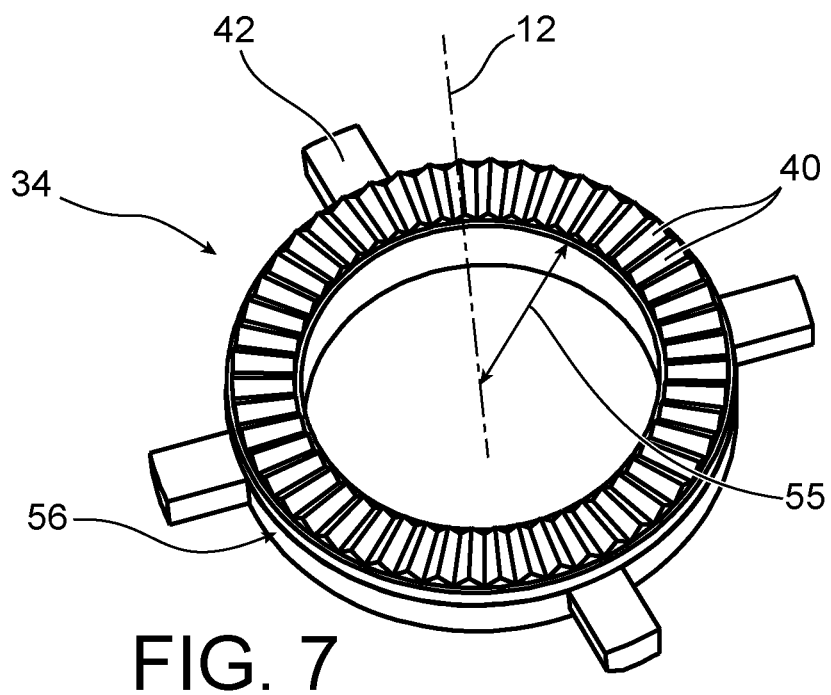
FIG. 7 represents a perspective view of a first toothed wheel equipping the holding ring dogging system shown in the previous figure.

A preferred disposition of these teeth will be described with reference to FIGS. 7 to 9.

First as regards the first wheel 34, its first axial teeth 40 are arranged within a single annular row 56, which is centred on the axis 12 and preferably continues over 360°. The number of teeth 40 can for example be in the order of fifty, with a regular pitch P provided between the same teeth 40.

The second wheel 36 includes in turn two annular rows, or a higher number of rows. However, in the preferred embodiment which is described, this number is set to two concentric annular rows 58a, 58b, centred on the axis 12.

The first row 58a, corresponding to the external row, is discontinuous. This implies that it is formed by toothed portions 60a each corresponding to an arc of circle provided with teeth 46. These toothed portions 60a are circumferentially preferably regularly spaced from each other. Between them, non-toothed portions 62a, corresponding to recessed portions are provided. By way of example, the first annular row 58a includes four toothed portions 60a of about ten teeth each, as well as four non-toothed portions 62a having substantially the same angular extent as the toothed portions 60a.

Similarly, the second row 58b, corresponding to the internal row, is discontinuous. This implies that it is formed by toothed portions 60b each corresponding to an arc of circle provided with teeth 46. These toothed portions 60b are circumferentially preferably regularly spaced from each other. Between them, non-toothed portions 62b, corresponding to recessed portions, are provided. By way of example, the second annular row 58b includes four toothed portions 60b of about ten teeth each, as well as four non-toothed portions 62b having substantially the same angular extent as the toothed portions 60b.

Figure 8:
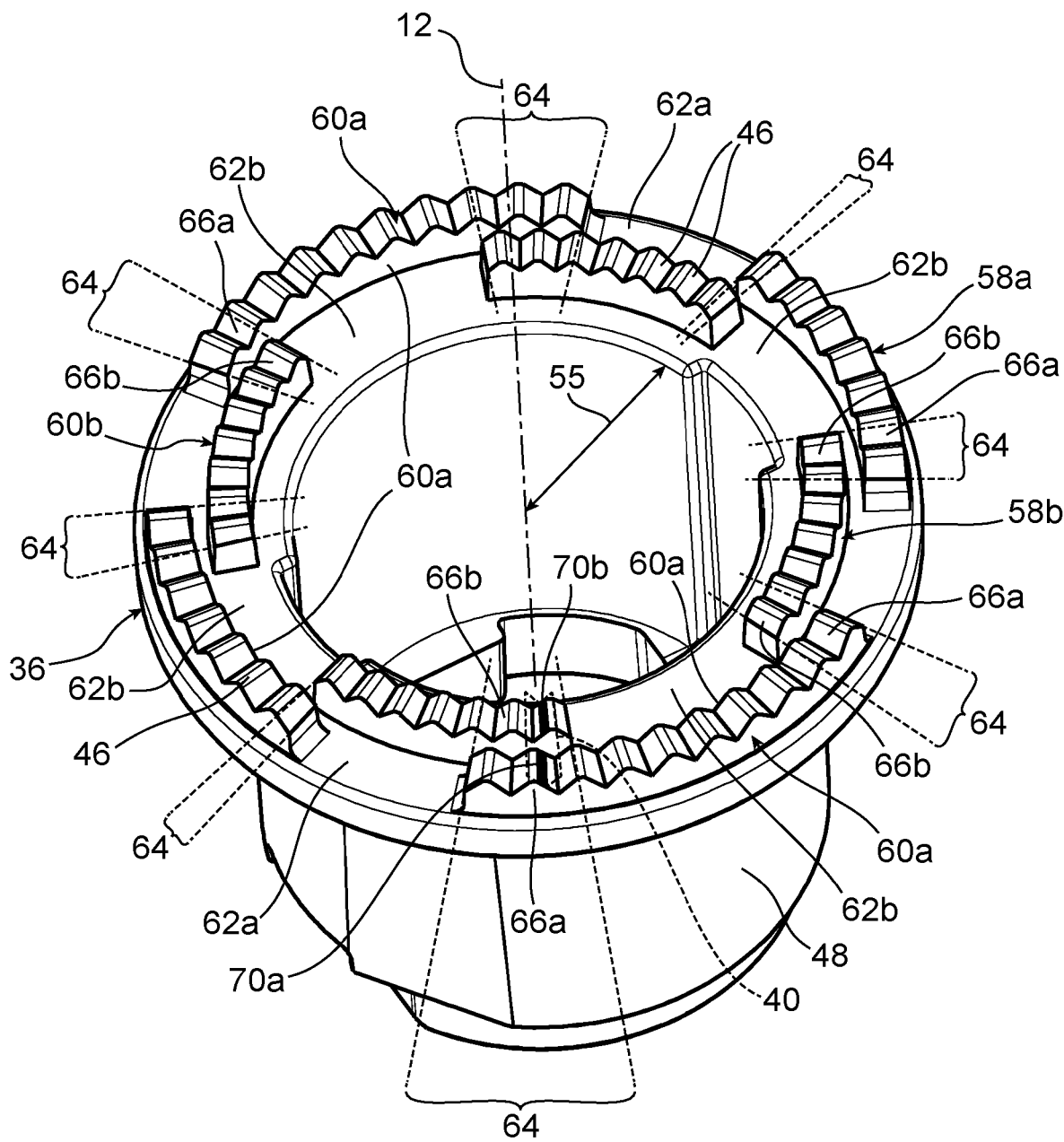
FIG. 8 represents a perspective view of a second toothed wheel equipping the holding ring dogging system shown in FIG. 6.
Figure 9:
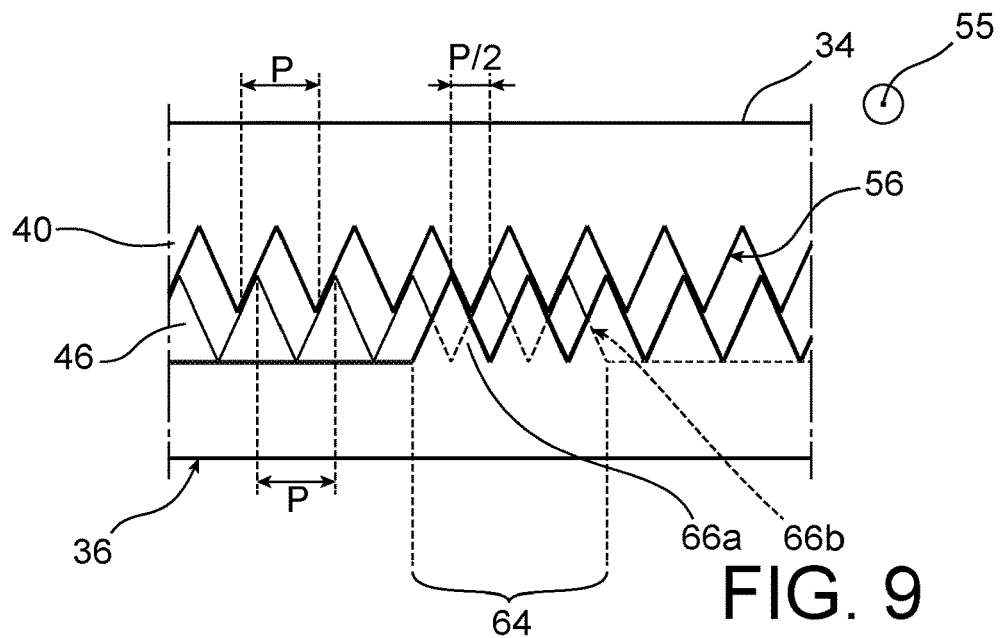
FIG. 9 is a side schematic view showing the cooperation between both toothed wheels shown in FIGS. 7 and 8.

As is visible in FIG. 8, the toothed portions 60a, 60b are arranged in phase offset, such that each toothed portion 60a is essentially radially facing a non-toothed portion 62b of the second row 58b, as well as each toothed portion 60b is essentially radially facing a non-toothed portion 62a of the first row 58a.

The pitch between the teeth 46 of each toothed portion 60a, 60b is the same pitch P as for the teeth 40 of the first wheel 34.

At the ends of these toothed portions 60a, 60b which partially cover each other along the radial direction 55, tooth covering zones are formed, these zones being referenced 64 in FIG. 8.

Each covering zone 64 is formed by a covering sector 66a corresponding to one end of one of the toothed portions 60a, as well as by a covering sector 66b corresponding to one end of one of the toothed portions 60a, Both sectors 66a, 66b are thus radially facing each other, to form one of the eight covering zones 64 provided here, regularly spaced from each other. The number of teeth per sector 66a, 66b is for example between two and five.

Within each covering zone 64, the teeth 46 of the sector 66a are offset by a half pitch P/2 with respect to the teeth 46 of the sector 66b. Consequently, each first tooth 40 which is in cooperation with one of the covering zones 64 of the second wheel 36, is in contact, on the one hand, with one of the teeth 46 of the sector 66a of this zone, and in contact, on the other hand, with one of the teeth 46 of the sector 66b of this same covering zone 64. This feature has been represented in FIG. 9, as well as at the bottom of FIG. 8 schematically showing a first tooth 40 in contact with two directly consecutive teeth 46 along the circumferential direction, and respectively belonging to both sectors 66a, 66b.

To do this, the radial length of each first tooth 40 is for example substantially twice higher than the radial length of each second tooth 46, which enables two contact surfaces 70a, 70b to be set between a first tooth 40, and both directly consecutive teeth 46 within the covering zone 64. In this respect, it is noted that these surfaces 70a, 70b, visible in the bottom of FIG. 8, are arranged on the upper part of the teeth 46. The reason for that is the phase offset provided between the teeth 46 of both sectors 66a, 66b, which results in the first teeth 40 not fully penetrating the troughs formed between the second teeth 46.

In operation, when the operator adjusts the desired volume via the control knob 8, he/she drives the screw 14 which in turn causes simultaneous rotation of the second wheel 36. The volume adjustment between its lower and upper limits usually requires several revolutions of the control knob. During the rotation movement of the second wheel 36, the second moving teeth 46 exert a force onto the first teeth 40 which tends to push back the first wheel 34 axially upwardly, before the same is again forced to return downwardly under the antagonistic effect of the spring 38. This axial reciprocating movement of the first lock wheel 34 is observed when switching from a tooth to another, and it enables the system 32 to index the screw 14 in a very high number of positions. This facilitates making an accurate adjustment of the desired volume. In particular, within each covering zone 64, the number of possible positions for a same first tooth 40 relative to the wheel 46, substantially corresponds to twice the number of second teeth 46 in each covering sector 66a, 66b forming this zone 64. By way of indicating purposes, it is noted that during a 360° rotation of the adjustment screw 14, it can be indexed in about ten different angular positions, with each of these positions being stable and accurate, because of an always different cooperation between the first and second teeth 40, 46.

The accuracy in the volume adjustment is advantageously increased, without affecting ease of manufacture of the toothed wheels 34, 36. This can for example be readily made by plastic injection, while preserving a satisfactory tooth quality.

One of the main features of the invention will now be described with reference to FIGS. 3 and 10 to 12, based on the association of a control system 74 with the ring dogging system 32 detailed above. When combined, both systems 32, 74 form a locking device 80 for the adjustment screw 14, this device 80 offering many functionalities.

With reference more precisely to FIG. 3, the control system 74 includes two distinct pieces, both annular and superimposed along the axis 12 along which they are centred. It is first a position selector 82, designed to be rotatably moved along the axis 12 between three positions including a free adjustment position, a fine adjustment position, and finally a locking position. To allow this movement in the three positions which will be detailed hereinafter, the selector 82 includes an external gripping portion 84 projecting axially upwardly with respect to the handle 2, and arranged about the control rod 10. This external gripping portion 84 is in the form of a flange that can be readily gripped by an operator, between his/her thumb and forefinger.

The portion 84 continues with an internal part 86 of the selector, made as a single piece with the portion 84. The internal part 86, housed in the handle 2, surrounds part of the spring 38. At its bottom end, it cooperates with the other piece of the system 74, mainly an annular control member 88 which surrounds both toothed wheels 34, 36. Both pieces 82, 88 are rotatably coupled to each other, through bumps 90 on a top end of the control member 88, housed in axial slots 92 on the bottom end of the selector 82. Both pieces 82, 88 are arranged so as to remain translationally fixed along the axis 12, while being rotatable about the same axis.

The control member 88 cooperates with the first toothed wheel 34, being the lock wheel for the ring dogging system 32. This cooperation is made via the radial lugs 42, which radially pass through the control member 88 such that their external ends are slidably housed in the longitudinal grooves 44 of the handle 2.

Figure 10:
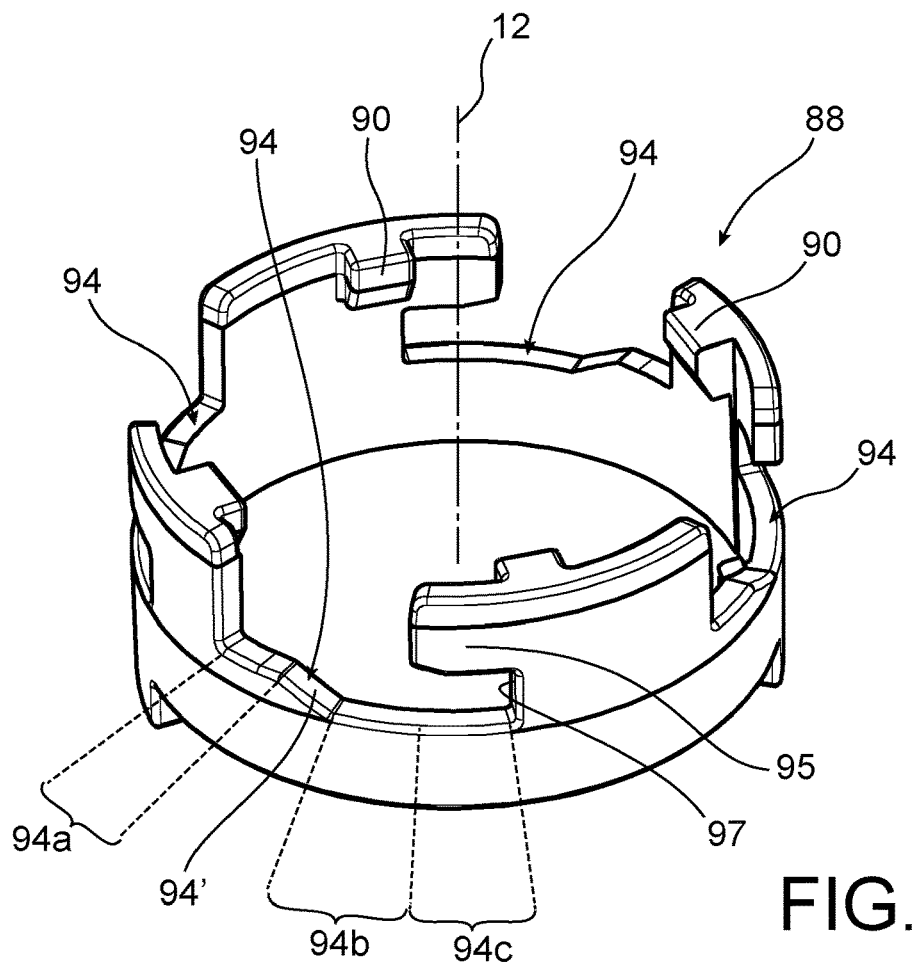
FIG. 10 represents a perspective view of a control member belonging to a system for controlling the locking device shown in FIG. 3.

Each radial lug 42 is associated with a track of the control member 88, by being pressed against this track via the spring 38 which acts on the toothed wheel 34 carrying these lugs. Since, the number of radial lugs 42 is four, four tracks are thus provided on the control member 88, as is represented in FIG. 10. Indeed, each of the four tracks 94 extends over an angular sector of the member 88 which is slightly lower than 90°. These four tracks 94 thus have identical shapes, and are provided to cooperate identically with their associated lugs, simultaneously. For this reason, the shape of only one of these tracks 94 will be described hereinafter.

The track 94 starts with a first track portion 94a, corresponding to the portion of the track located highest in the axial direction. To the right in FIG. 10, a second track portion 94b is then provided, which is axially offset from the first track portion 94a, by being located lower. A transition zone 94' is arranged between both portions 94a, 94b, this transition zone 94' having the shape of a slope tilted downwardly from the first track portion 94a, to the second track portion 94b.

Finally, to the right from the second track portion 94b, a third track portion 94c is provided, which is located axially at the same level and in the continuity of the second portion 94b. A stop element 95 is arranged axially facing the third track portion 94c, by being carried by the control member 88. With this third track portion 94c, the stop element 95 forms a slot 96 circumferentially open on the side where the second portion 94b is located. On the opposite side, the slot is closed by a slot bottom 97. Consequently, this configuration takes the form of a hook circumferentially open towards the second track portion 94b.

Figure 11A:
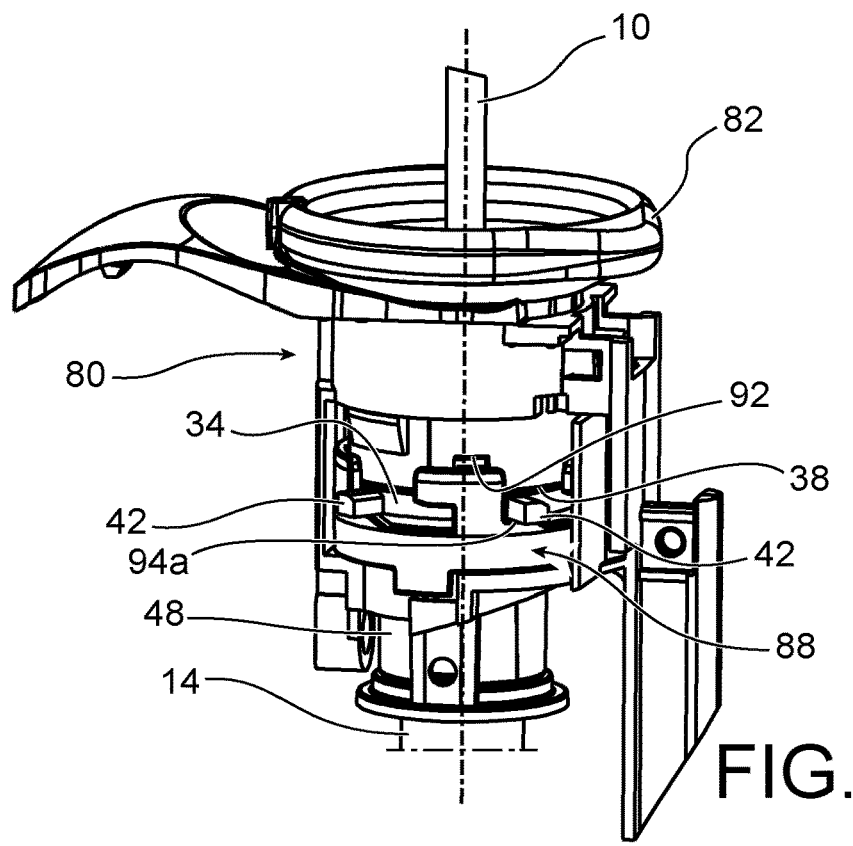
FIGS. 11a to 11c are perspective views showing the control system, in different positions.
Figure 11B:
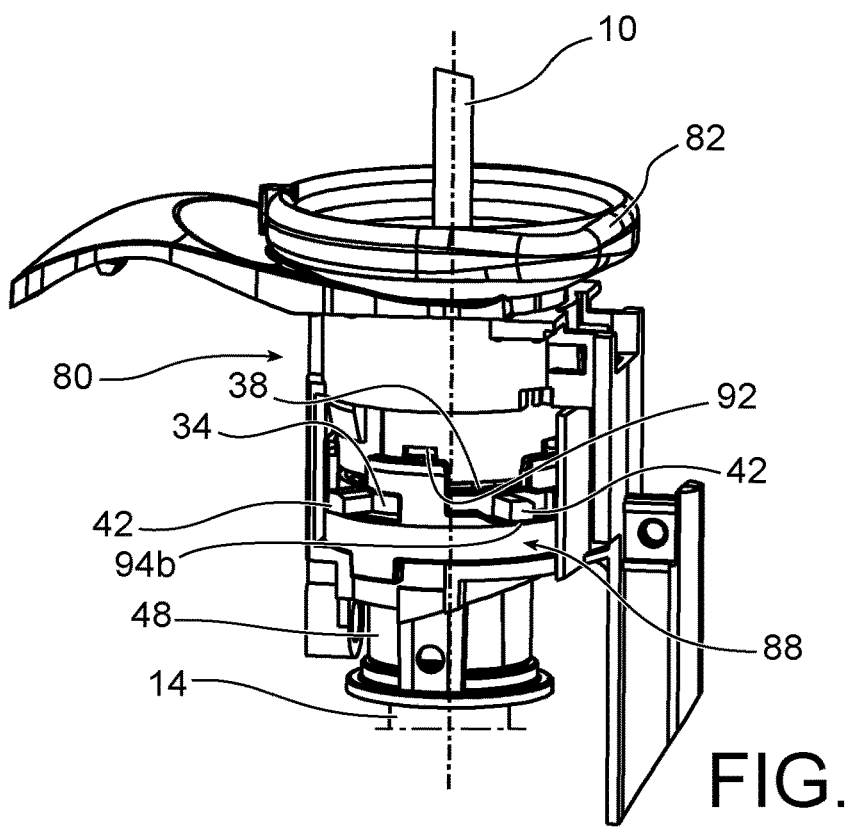
Figure 11C:
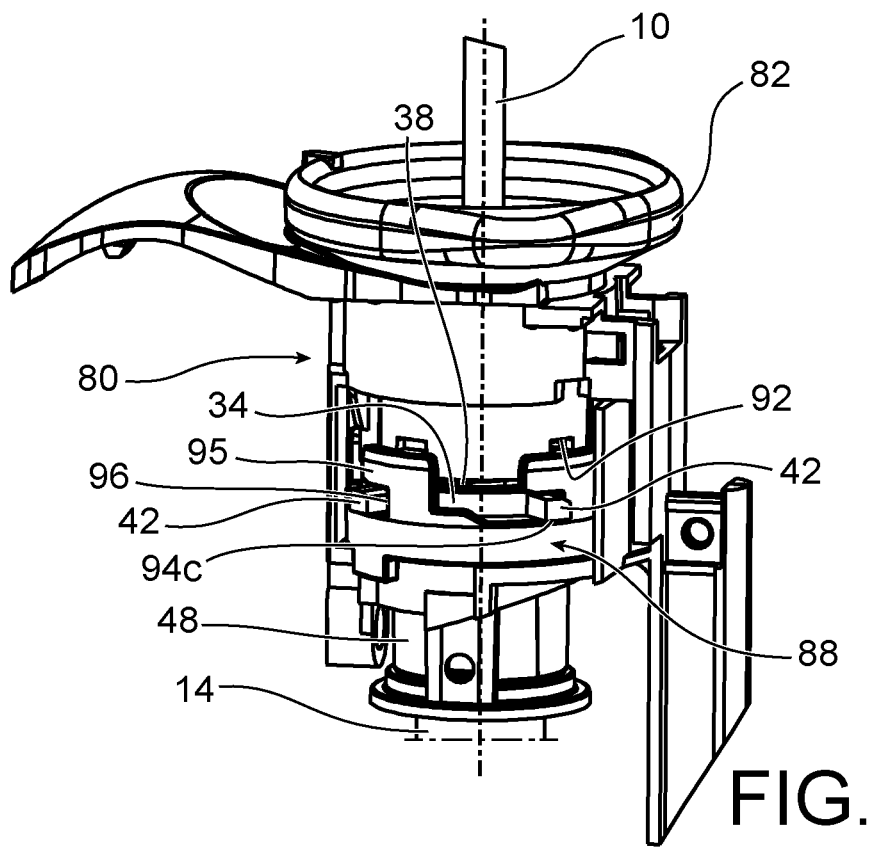

With reference now more specifically to FIGS. 11a to 11c, the locking device 80 is represented in different positions. First, FIG. 11a represents the selector 82 in a free adjustment position, bringing the radial lugs 42 on the first track portions 94a. Thus, this first portion 94a holds the lock wheel 34 upwardly, in a position axially away from the second toothed wheel. This axial distance is carried out by opposing the force developed by the spring 38 on this same lock toothed wheel 34, such that the first and second teeth do not cooperate with each other as was described in connection with FIG. 9. In this position, since the teeth do no longer put up a resistance to the rotation of the volume adjustment screw 14, a larger volume range can be scanned, without any particular effort from the operator. Hence, the volume adjustment ergonomics is largely improved.

With reference then to FIG. 11b, the selector 82 is represented in a fine adjustment position, bringing the radial lugs 42 onto the second track portions 94b. The spring 38, which presses the lugs 42 against the second track portion 94b located axially lower, places the lock wheel 34 in cooperation with the second toothed wheel. The first and second teeth of these wheels cooperate with each other, and shifting from a tooth to another occurs as a result of the rotation of the screw 14, within the scope of an accurate and ergonomic adjustment. It is in this adjustment position that the principle of shifting from a tooth to another, as shown with reference to FIGS. 7 to 9, occurs. Indeed, the control member 88 allows the lock wheel 34 to axially move away from and closer to the second wheel when shifting from a tooth to another caused by the rotation of this second wheel, given that the lugs 42 are free to move axially upwardly with the lock wheel 34.

With reference finally to FIG. 11c, the selector 82 is represented in a locking position, bringing the radial lugs 42 onto the third track portions 94c. More precisely, each lug 42 is axially housed between the third track portion 94c against which it is forced to bear by the spring 38, and the axial stop element 95, in order to be axially trapped in the slot 96. The stop elements 95 therefore lock any axial upward movement of the lugs 42 and the associated lock wheel 34, hence prohibiting any disengagement of the first and second teeth. Consequently, the adjusted volume cannot be modified. This locking position is preferentially assumed during pipetting operations, in order to prevent the operator from accidentally changing the target volume by rotating the control knob against which his/her thumb bears.

The three positions are thus appropriately selected by the operator, depending on the desired adjustment. For example, the beginning of the adjustment can be made in the free adjustment position to scan a large volume range without any effort, and then upon approaching the target value, the fine adjustment position can be assumed so as to easily reach this accurate value. Once it is reached, the selector can then be placed in the locking position, in order to prevent any accidental target volume change, during subsequent pipetting operations.

Figure 12:
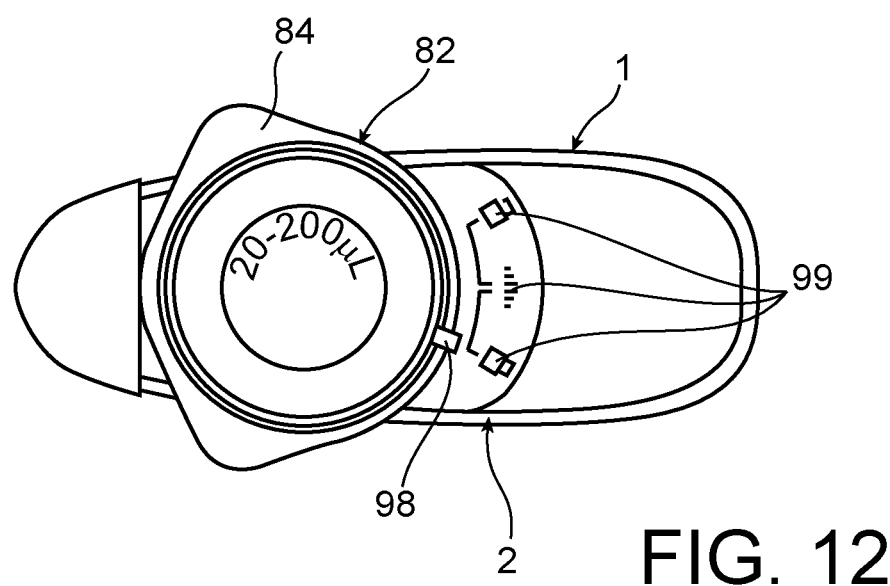
FIG. 12 represents a top view of the pipette shown in the previous figures.

With reference to FIG. 12, it is shown that the pipette 1 can be equipped with a system enabling the operator to be visually informed of the position of the selector 82. To do this, the external surface of the handle 2 or the external gripping portion 84 of the selector 82 has a slider 98, whereas the other of both elements has three marks 99 depicting the three possible positions respectively. It is the alignment of the slider 98 with one of the marks 99 which enables the operator to determine the position in which the selector 82 is. In this respect, it is noted that the free adjustment position of the selector 82 is offset by an angular value between 15 and 30° with respect to the fine adjustment position located in the centre. Likewise, in the opposite circumferential direction, the locking position is offset by an angular value between 15 and 30° with respect to the fine adjustment position. These angular values are for example in the order of 20°, corresponding to the angular movement the operator has to impose to the selector 82, in order to shift from the central fine adjustment position to one of both free adjustment or locking end positions.

Finally, in addition to the marks 99, the operator is warned of the selector 82 shifting to each of the three positions by clicks, which are conventionally achieved by form-fitting between the handle 2 and the selector 82.

Of course, various modifications can be provided by those skilled in the art to the invention just described, only by way of non-limiting examples, and the scope of which is defined by the appended claims. For example, within the holding dog ringing system 32, modifications could be provided to place multiple annular rows on the first wheel, and not on the second toothed wheel which would thereby have only one single annular row of teeth. Alternatively, both toothed wheels each could have only one annular row of teeth, without departing from the scope of the invention.

What is claimed is:

1. A pipetting system comprising:
a volume adjustment screw; and
a locking device for locking said volume adjustment screw, the locking device comprising:
  a ring dogging system for holding a position of the volume adjustment screw, the ring dogging system including:
    a first toothed wheel comprising first teeth,
    a second toothed wheel comprising second teeth, said first toothed wheel being a lock wheel for being rotatably fixed with respect to a handle of the pipetting system, and the second toothed wheel for being rotatably integral with the volume adjustment screw, or vice versa, and
    elastic return means capable of returning the first and second toothed wheels against each other in order to make the first teeth cooperate with the second teeth; and
  a control system for controlling the ring dogging system, the control system including:
    a position selector designed to be rotatably moved along a longitudinal central axis of the pipetting system, between three positions including a free adjustment position, a fine adjustment position, and a locking position, and
    a ring rotatably integral with the position selector, the ring cooperating with said lock wheel of the ring dogging system such that:
    a) when the position selector is in the free adjustment position, the control member ring holds the lock wheel axially away from the second toothed wheel of the ring dogging system, by opposing a force developed by the elastic return means, such that the first and second teeth do not cooperate with each other;

b) when the position selector is in the fine adjustment position, the control member ring allows the lock wheel to axially move away from and then closer to the second toothed wheel when shifting from a tooth to another caused by rotation of said second toothed wheel; and c) when the position selector is in the locking position, the ring axially locks said lock wheel so as to prohibit disengagement of the first and second teeth.

2. The pipetting system according to claim 1, wherein the lock wheel includes at least one radial lug projecting outwardly, and in that the ring includes at least one track associated with each radial lug, the elastic return means forcing the radial lug to bear against said at least one track, the at least one track comprising:

a first track portion cooperating with the radial lug when the position selector is in the free adjustment position;

a second track portion cooperating with the radial lug when the position selector is in the fine adjustment position, the second track portion being axially offset from the first track portion within the ring; and a third track portion cooperating with the radial lug when the position selector is in the locking position, a stop element provided on the ring being arranged axially facing the third track portion, such that the radial lug is axially located between said stop element, and the third track portion.

3. The pipetting system according to claim 2, wherein the first, second and third track portions are arranged in this order along a circumferential direction.

4. The pipetting system according to claim 2, wherein the at least one track includes a slope-shaped transition zone between the first and second track portions, and in that the second track portion is axially located at a same level as the third track portion.

5. The pipetting system according to claim 2, wherein the stop element forms, with the third track portion, a slot circumferentially open on a side of the second track portion, and closed on an opposite side by a slot bottom.

6. The pipetting system according to claim 2, wherein the ring includes several tracks circumferentially spaced from each other, each cooperating with a radial lug of the lock wheel.

7. The pipetting system according to claim 1, wherein the ring is annular.

8. The pipetting system according to claim 1, wherein the ring and the position selector are made as a single piece, or by two distinct rotatably coupled pieces.

9. The pipetting system according to claim 1, wherein:

said second teeth of the second toothed wheel form a number N of concentric annular rows, the number N being an integer higher than or equal to 2 and each row being possibly discontinuous, said second toothed wheel has at least one teeth covering zone in which the N annular rows of second teeth respectively have N covering sectors which cover each other along a radial direction of the second toothed wheel, and the second teeth of the N covering sectors are angularly offset from each other such that at least one of the first teeth of the first toothed wheel can be in several relative positions with respect to the second toothed wheel, in each of which said first tooth is in contact with one of the second teeth of one of the N covering sectors and in contact with one of the second teeth of another of said N covering sectors.

10. The pipetting system according to claim 1, further comprising a four-digit counter.

11. The pipetting system according to claim 1, wherein the position selector has an external gripping portion arranged about a control rod for controlling the pipetting system.

12. The pipetting system according to claim 1, wherein the pipetting system is designed to warn of the position selector shifting to each of said three positions, by clicks.

13. The pipetting system according to claim 2, wherein each radial lug of the lock wheel radially passes through the ring of the control system, to be slidably housed in a corresponding longitudinal groove of the handle of the pipetting system.

14. The pipetting system according to claim 1, wherein the free adjustment position of the position selector is offset, in a circumferential direction, by an angular value between 15 and 30° with respect to the fine adjustment position, and in that the locking position is offset, in an opposite circumferential direction, by an angular value between 15 and 30° with respect to the fine adjustment position.

\* \* \* \* \*